United States Patent [19]
Corren et al.

[11] Patent Number: 4,613,279
[45] Date of Patent: Sep. 23, 1986

[54] KINETIC HYDRO ENERGY CONVERSION SYSTEM

[75] Inventors: Dean R. Corren; Gabriel Miller, both of New York, N.Y.

[73] Assignee: Riverside Energy Technology, Inc., New York, N.Y.

[21] Appl. No.: 592,325

[22] Filed: Mar. 22, 1984

[51] Int. Cl.⁴ ................................................ F03B 3/12
[52] U.S. Cl. ............................ 415/2 A; 416/223 A; 416/234; 416/DIG. 2; 415/121 G
[58] Field of Search ................ 415/2 A, 4 A, 121 G; 416/247 A, 234 R, 234 A, 223 A, DIG. 2

[56] References Cited

U.S. PATENT DOCUMENTS

| | | |
|---|---|---|
| 61,362 | 1/1867 | Rowe . |
| 328,593 | 10/1885 | Main . |
| 507,294 | 10/1893 | Vance .................... 416/247 A X |
| 867,192 | 9/1907 | Dawson . |
| 868,798 | 10/1907 | McLaughlin . |
| 903,592 | 11/1908 | Low . |
| 914,574 | 3/1909 | Imboden .................... 416/176 A X |
| 1,123,491 | 1/1915 | Corbin .................... 415/4 A X |
| 1,147,658 | 7/1915 | Stukes . |
| 1,396,609 | 11/1921 | Weisenborn . |
| 1,512,545 | 10/1924 | Kaplan .................... 416/223 A X |
| 1,555,879 | 10/1925 | Ruzicka .................... 415/151 |
| 1,602,755 | 10/1926 | Delage .................... 416/208 X |
| 1,669,055 | 5/1928 | Hogg . |
| 1,713,446 | 5/1929 | Peterson .................... 416/247 A |
| 1,790,969 | 2/1931 | Bray . |
| 1,903,545 | 4/1933 | Hampton .................... 415/121 G |
| 2,116,055 | 5/1938 | Weichwald .................... 416/242 X |
| 2,213,610 | 9/1940 | Ronning .................... 416/247 A |
| 2,355,842 | 8/1944 | Arado .................... 416/247 A X |
| 2,501,696 | 3/1950 | Souczek . |
| 2,723,641 | 11/1955 | Taylor .................... 416/247 A |
| 3,027,864 | 4/1962 | Polson .................... 416/247 A |
| 3,209,156 | 9/1965 | Struble .................... 415/2 A X |
| 3,980,894 | 7/1976 | Vary et al. . |
| 3,986,787 | 10/1976 | Mouton et al. .................... 415/121 G X |
| 4,026,587 | 5/1977 | Hultman et al. . |
| 4,116,581 | 7/1978 | Bolie . |
| 4,163,904 | 8/1979 | Skendrovic .................... 415/2 A X |
| 4,274,009 | 6/1981 | Parker, Sr. . |
| 4,306,157 | 12/1981 | Wracsaricht . |
| 4,313,059 | 1/1982 | Howard . |
| 4,324,984 | 4/1982 | Borgren . |

FOREIGN PATENT DOCUMENTS

| | | |
|---|---|---|
| 456963 | 5/1949 | Canada .................... 416/223 R |
| 989170 | 9/1951 | France .................... 416/121 A |
| 2485106 | 12/1981 | France .................... 415/3 A |
| 28244 | 10/1917 | Norway .................... 416/DIG. 2 |

*Primary Examiner*—Everette A. Powell, Jr.
*Attorney, Agent, or Firm*—Sprung Horn Kramer & Woods

[57] ABSTRACT

A kinetic hydro energy conversion system having a turbine for mounting in a hydro energy source, wherein the turbine comprises a rotor having conformal blades and a screen for horizontally deflecting debris from the blades.

11 Claims, 13 Drawing Figures

KINETIC HYDRO ENERGY CONVERSION SYSTEM

BACKGROUND OF THE INVENTION

The present invention relates to a kinetic hydro energy conversion system and in particular to an underwater turbine-generator for use therewith.

It has long been desirable to utilize free flowing water in rivers or estuaries for the generation of electricity. Several prior art patents have been issued wherein such systems have been disclosed, however these prior art patents have not resulted in any commercially effective kinetic hydro energy conversion system.

SUMMARY OF THE INVENTION

The main object of the present invention is to provide an underwater turbine-generator for a kinetic hydro energy conversion system which advances the state of the art simultaneously in several areas to obtain an underwater axial flow turbine which is not unlike such turbines which are used for wind energy conversion, but differing in important respect to obtain an efficient underwater turbine-generator for use in free-flowing water.

The present invention, unlike previous efforts to generate electricity from flowing water, is practical and economic because its design uses both modern techniques and simple construction to achieve long term unattended operation.

A further object of the present invention is to provide a kinetic hydro energy conversion system for unidirectional river flow wherein the turbine generator preferably includes a turbine mounted and held in place by a heavy reinforced concrete base which is either entirely prefabricated or prefabricated as a caisson and poured in place on the river bottom. Tied to the steel reinforcement of the concrete base is a strong steel structure which supports both the turbine and its protective screen. The turbine rotor must be protected from submerged objects carried by water current and this is preferably achieved by a screen made of steel bars, constructed so as to deflect rather than trap debris. In a preferred embodiment according to the present invention, a plumb bow screen is used which has a novel design which protects the circular area of the rotor utilizing a single straight leading edge, parallel grid bars and cause only horizontal deflection of debris.

The turbine rotor is preferably configured so that water flowing past the rotor causes it to rotate which in turn causes the gear box and generator shafts of the turbine to rotate. The rotor may be located either upstream or downstream of the machinery and it can be comprised of any number of blades, with two to six being the most preferred.

The turbine rotor according to the present invention is substantially designed according to the Glauert propeller theory. This theory has been utilized for the water environment, which is significantly different from that of air in terms of density, velocity and the potential for cavitation. The rotor design according to the present invention has taken these factors into account and additional factors having to do with the actual strength and geometry of the water rotors. These considerations have resulted in the creation of conformal blades and this design solves the problem that the chord of a given blade section is on the order of the radial distance of that section and thus, simple, flat, tangent foil shaped incur error in terms of contradicting the assumptions of the Glauert theory.

Specifically, the conformal blades in accordance with the present invention cause the airfoil sections to be aligned with the direction of rotating motion of the blades. This correction has been found to be especially important near the hub. In the conformal blades, the flat foil sections are effectively curved around the surface of an imaginary cylinder coaxial with the rotor and of a radius equal to that of the section.

The present invention also includes mechanical and electric generation components situated in a watertight containment or nacelle. These components are protected from water intrusion by various static seals and an arrangement of long-life, high effectiveness rotating shaft face seals for the low speed rotor shaft. In accordance with the present invention, the shapes of the rotor hub and shaft housing can be such that they act as a classifier, which, by the rotation of the hub, passively tends to expel destructive water borne particles from the area of the seal thus helping to prolong its life. Significant water intrusion through the seals can be detected and causes turbine shut down and alarm.

In an alternative embodiment, the nacelle is eliminated by using a unitary sealed torque hub for the gearbox with a face mount generator mounted directly to it. Both of these components are fully sealed and require no separate nacelle. This embodiment also has the advantage of achieving the most efficient cooling by the ambient water.

The rotating mechanical components in the present invention include the slow speed shaft, couplings, gearbox, high speed shaft, brake (optional) and electric generator. Rotor speed for this device is approximately 60 rpm for a 12 foot diameter machine which is inherently low compared to that of practical electric generators. The speed must be increased by a gearbox to a generator speed in the range of approximately 900 to 3600 rpm. Furthermore, the water speed and thus rotor speed varies over a range, and thus means are provided to generate electricity usefully at different speeds of rotation. This is accomplished in a number of ways, including DC to synchronous AC, asynchronous AC to DC to synchronous AC, an AC induction generator, and a number of other techniques which to electronically provide synchronous AC power with a variable-speed prime mover.

Power, signal and control conductors are taken to a point on shore for control and protection and eventual interconnection by submarine electric cables.

In another embodiment of the present invention, a box or building on shore will contain control logic and protective relaying for one or more turbine units. The box or building also contains devices for conditioning the power for interconnecting with the utility grid or local demand.

In a further embodiment according to the present invention, the system is usable with a bidirectional resource such as tidal estuaries and wherein the aforementioned embodiment further comprises means mounting the turbine to articulate around the yaw axis, thus capturing energy in both directions. Since, unlike wind, reversing water currents are approximately opposite in direction, this yaw device can incorporate stops which permit only slightly less than 180 degree rotation, thereby eliminating the need for expensive and potentially unreliable slip rings. In this case, the entire turbine and screen structure will turn together as a unit around a yaw bearing in a vertical pylon.

The present invention will now be described in more detail with regard to the following description and the attached drawings, wherein:

DETAILED DESCRIPTION OF THE INVENTION

Figure 1:
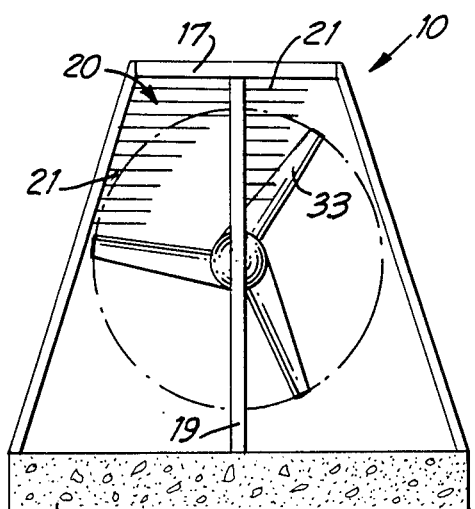
FIG. 1 is a front view of a turbine according to the present invention.
Figure 2:
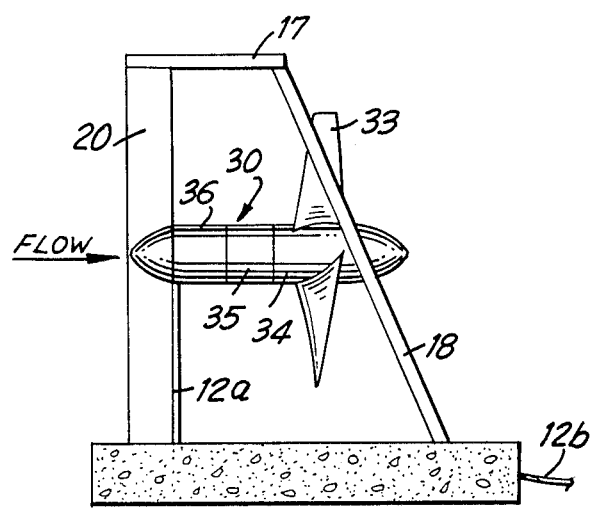
FIG. 2 is a side view of the turbine of FIG. 1.

Referring now to FIGS. 1-2, a kinetic hydro energy conversion system 10 includes a heavy reinforced concrete base 11 to which a steel support structure 17, 18 and 19 are connected for supporting both the turbine 30 and its protective screen 20.

In the embodiment shown in FIGS. 1 and 2, the screen 20 is constructed of steel bars so as to deflect rather than trap debris. The novel design shown in FIGS. 1 and 2, protects the circular area of rotor 33 utilizing a single straight leading edge comprising the spine 19 which is part of the support structure and has parallel grid bars 21 connecting the spine 19 to the back supports 18 and causing only horizontal deflection of debris.

The turbine shown in FIGS. 1 and 2 has a partial nacelle 36 and a unitized torque hub meaning the torque hub 34 has the motor 35 mounted directed to it in a sealed housing. Wires 12a pass through a conduit in a protected position on the screen 20 and pass through the concrete base and outwardly thereof as wires 12b for connection.

Figure 4:
FIG. 4 is a sectional view of a different sections of FIG. 3.
Figure 3:
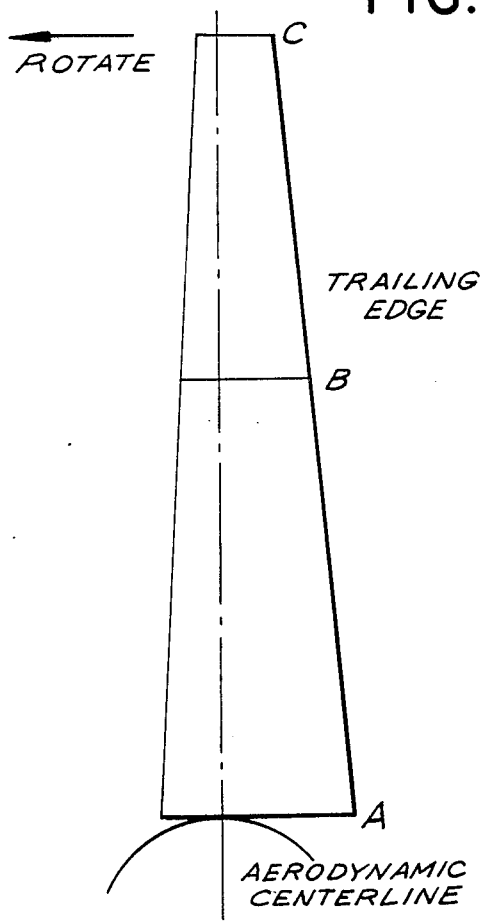
FIG. 3 is a front view of a nonconformal blade.
Figure 5:
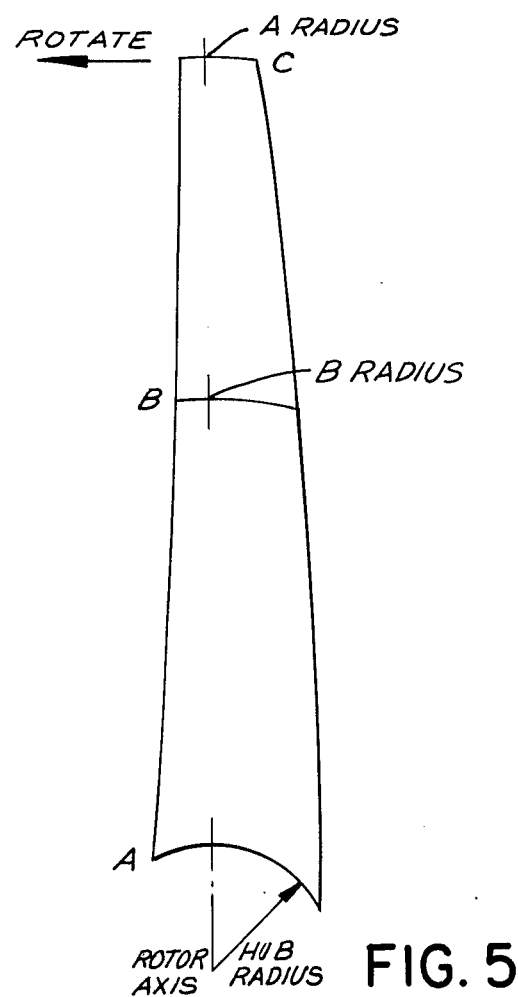
FIG. 5 is a front view of a conformal blade according to the present invention.

The blades used in rotor 33 are shown in more detail in FIGS. 3-5. FIGS. 3 and 4 show the configuration of a nonconformal blade in a front view in FIG. 3 and a sectional view at lines A, B and C in FIG. 4.

The conformal blades differ from the nonconformal blades in that it solves the problem that the chord of a given blade section is on the order of the radial distance of that and thus simple, flat, tangent foil shapes incur error in terms of contradicting the assumptions of the Glauert theory of wind propeller design. The conformal blades cause the airfoil sections to be aligned with the direction of rotating motion of the blades. In particular, near the hub, the flat foil sections are effectively curved around the surface of the imaginary cylinder coaxial with the rotor and of a radius equal to that of the section. FIG. 5 illustrates the three dimensional phenomonon in a two dimensional figure.

Figure 6:
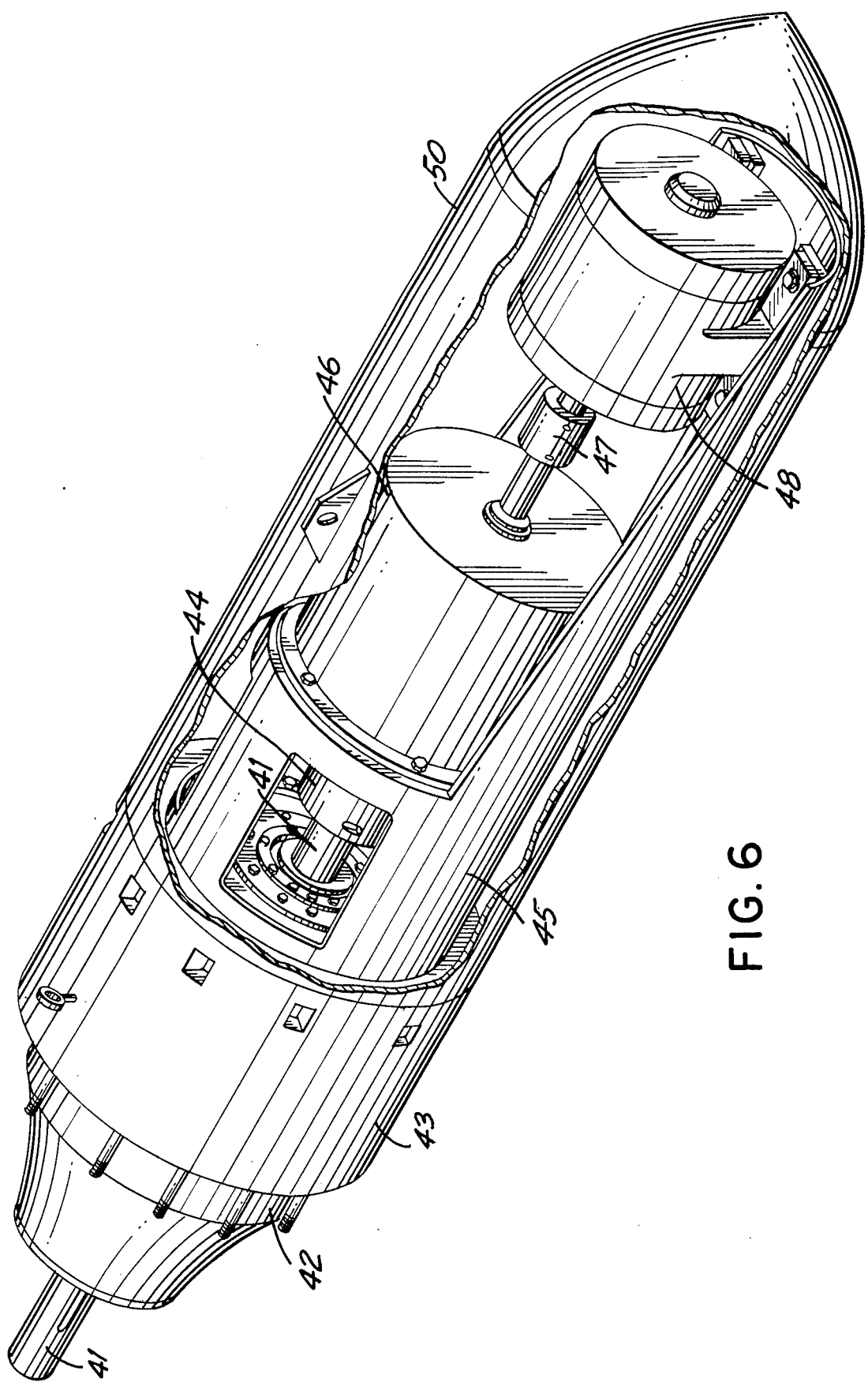
FIG. 6 is a partial cutaway view of the turbine according to the present invention.
Figure 7:
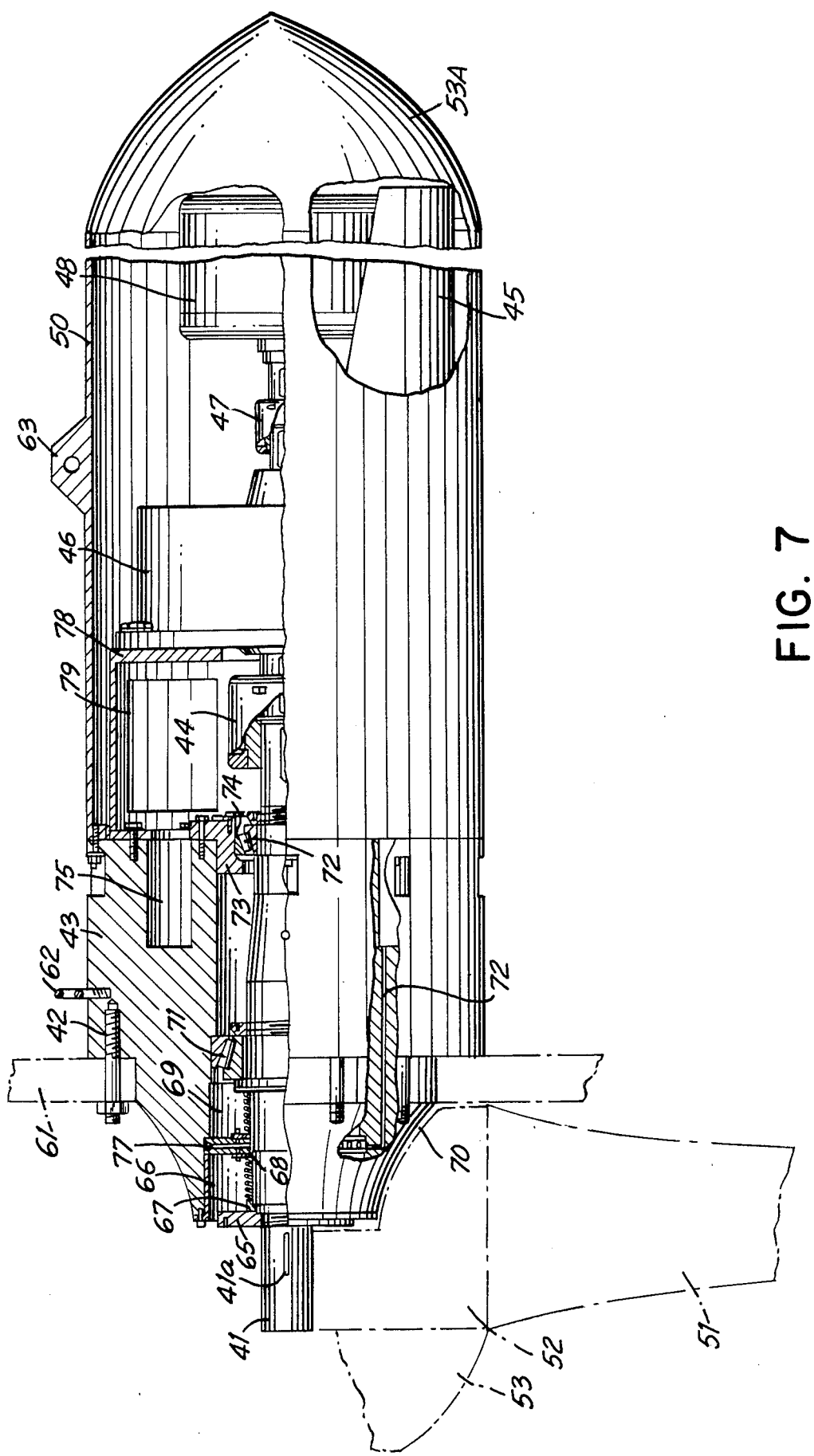
FIG. 7 is a partial sectional and cutaway view of the turbine of FIG. 6.

FIGS. 6-7 illustrate the mechanical and electrical generation components in a water tight nacelle in accordance with the present invention. In the embodiments shown in FIG. 6, the main shaft 41 extends from a unitary nacelle 50 which forms a housing torque hub for the gearbox 46 and generator 48. The elements are interconnected as shown, with the main shaft 41 extending out of the shaft housing 43 which has mounting studs 42 extending therefrom. The main shaft 41 is coupled by a low speed shaft coupling 44 in nacelle 50 to gearbox 46 whose output shaft is coupled by a high speed shaft coupling 47 to generator 48. Gearbox 46 and generator 48 are further supported by a shovel base 45.

FIG. 7 shows in more detail the seals and other means utilized to provide a water tight containment of the mechanical and electrical generation components of the system according to the present invention.

As can be clearly seen, the shaft housing 43 is mounted by way of mounting studs 42 on a mounting ring 61. The rotor hub 52 having blades 51 depending therefrom and a nose cone or fairing 53 at the front thereof is mounted on main shaft 41 with key way 41a preventing any relative rotation. The rear of nacelle 50 has a rear fairing 53A to help to flow smoothly thereover.

It should be noted, that the configuration of the rotor hub and shaft housing as shown in FIG. 7 form a classifier 70, which, by the rotation of the hub, passively tends to expel desctructive water borne particles from the area of the outboard seal 64 disposed between the shaft sleeve 65 and the shaft housing 43.

Other portions of the shaft mounting comprise an outboard main seal cavity 66 around the thrust collar 67 and further sealed by shaft seals 68. Additionally, an inboard main seal cavity 69 is formed in front of a front main bearing 71. The shaft is also mounted by a rear main bearing 72 held by a rear main bearing carrier 73 and a rear main bearing retaining in oil seal 74. The shaft housing 43 also includes a wire way 75 and a weep channel 76 near the lantern ring 77.

In the nacelle 50, is further disposed a gearbox mounting flange 78 and hand holes 79 in the shovel base 45. In order to effect the placement of the system in a river, lifting eyes 62 and 63 are provided on the shaft housing and the nacelle respectively.

Figure 8:
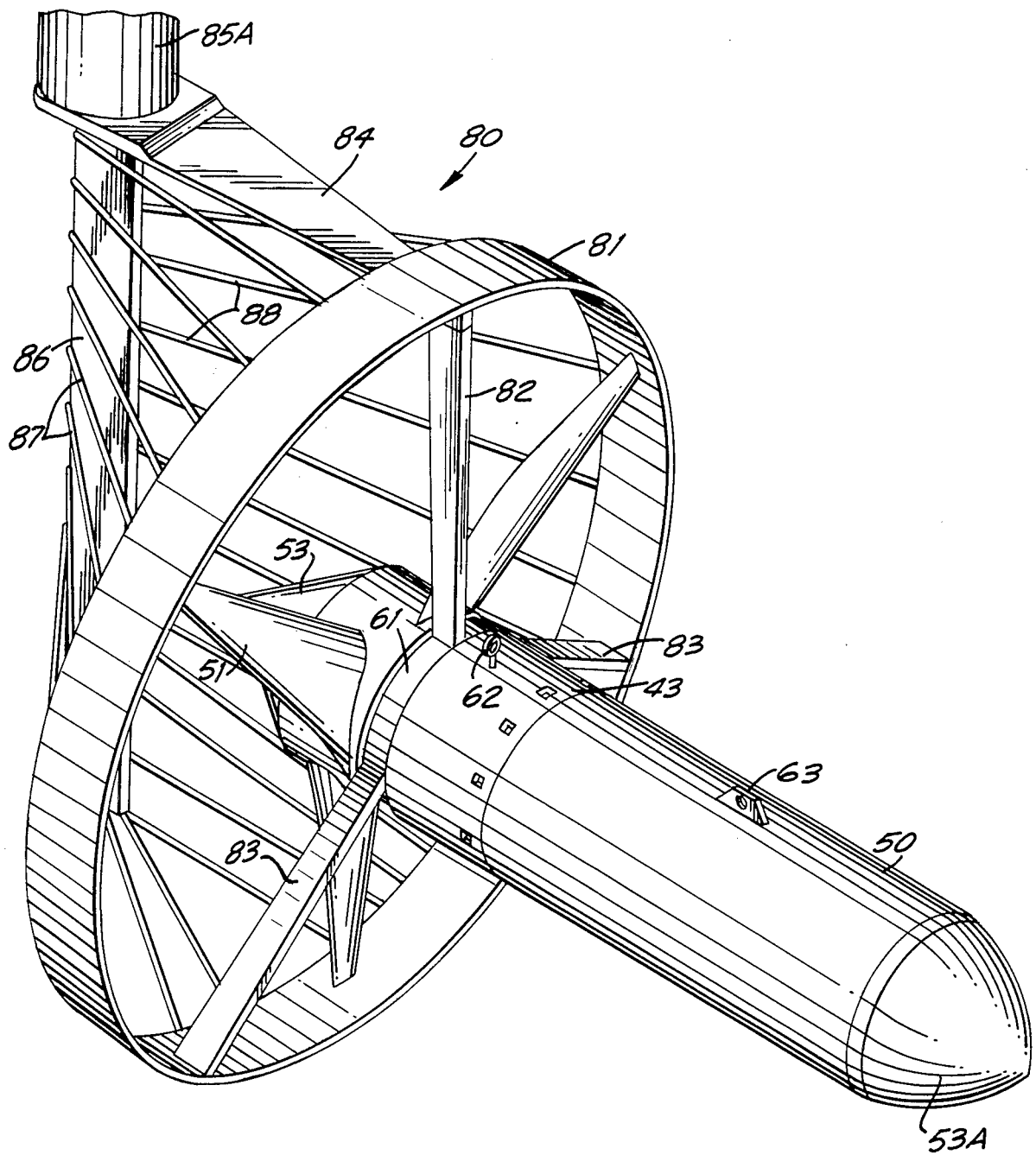
FIG. 8 is a perspective view of the turbine of FIG. 6 with a plumb bow screen according to the present invention.

FIG. 8 shows a plumb bow screen 80 for use with the device shown in FIG. 7 and specifically comprising a hoop 81 connected to the mounting ring 61 by plumb spoke 82 and lateral spokes 83. Extending from the top of the hoop 81 is a trailing boom 84 which has a pylon flange 85 at the leading edge thereof. The pylon 85A mounts the turbine from above, as opposed to the FIGS. 1-2 embodiment. Depending downwardly from the pylon flange 85 is plumb bow 86 which supports the bars 87 and 88 which extend from the plumb bow to the hoop. The configuration shown in FIGS. 6-8 is that of an upstream rotor, as opposed to the downstream rotor shown in FIGS. 1-2 and hereinafter in FIGS. 9-11.

Figure 13:
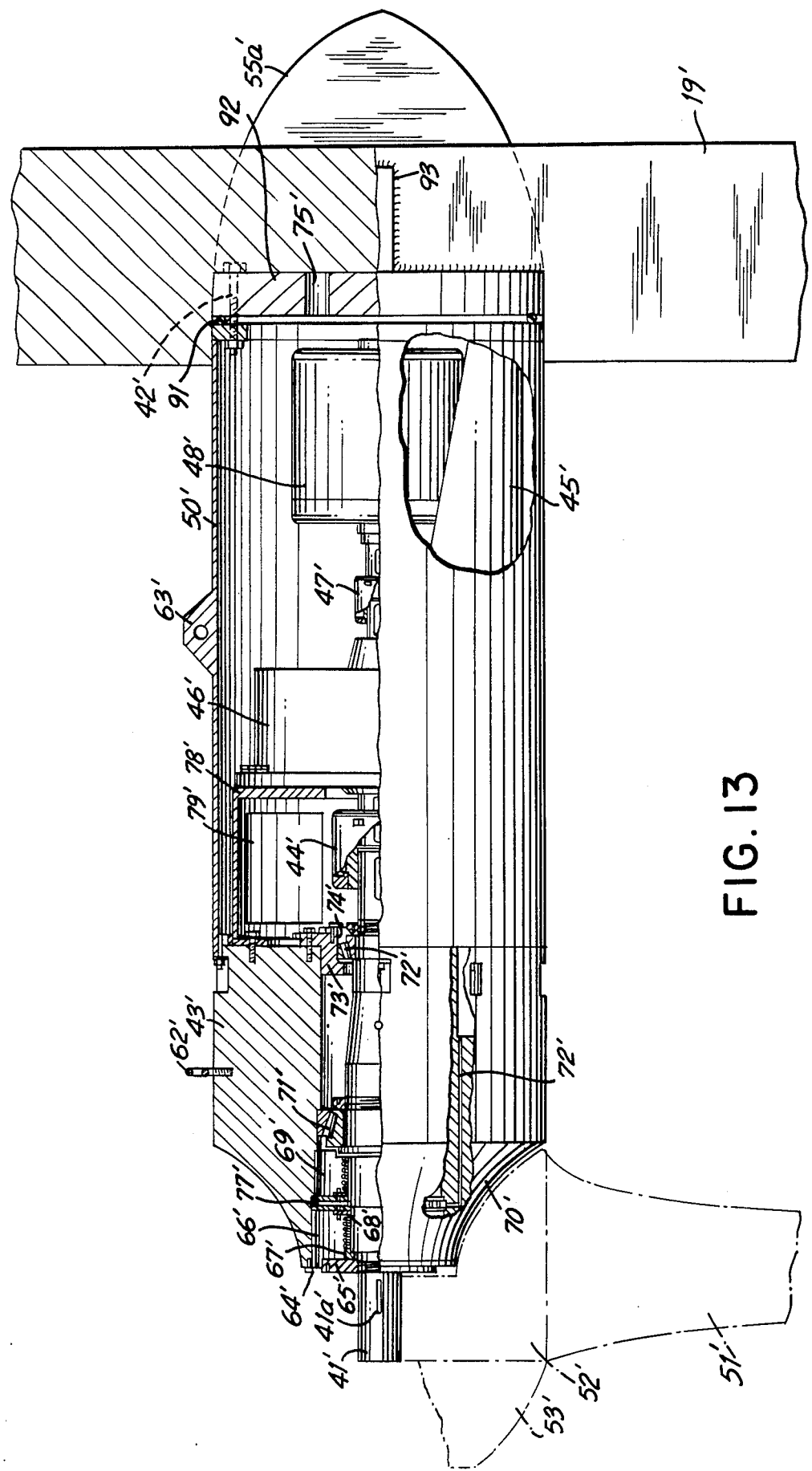
FIG. 13 shows an alternative embodiment.

FIG. 13 shows an alternative embodiment of the turbine of FIGS. 6-8 in the manner in which the turbine is mounted. As noted above, the configuration shown in FIGS. 6-8 is that of an upstream rotor. FIG. 13 shows the mounting of the same rotor as a downstream rotor connected to a spine 19′ similar to that shown in FIG. 1. In the embodiment shown in FIG. 13, all of the elements which are identical in function to those of FIG. 7, are listed with the same label primed.

In addition, this embodiment includes an end plate 92 directly welded to the spine 19' and the nacelle is mounted to the end plate 92 via mounting screws 42'. The end plate 92 has a wire way 75' so that wires can pass through same to the base. The end plate 92 is sealed to the nacelle with an O-ring 91. The spine 19' has a hollow center for communication with the wire-way 75 and for the passage of wires to the base. A reinforcing rib 93 is welded to the end plate 92 to further aid in the support of the turbine.

Figure 9:
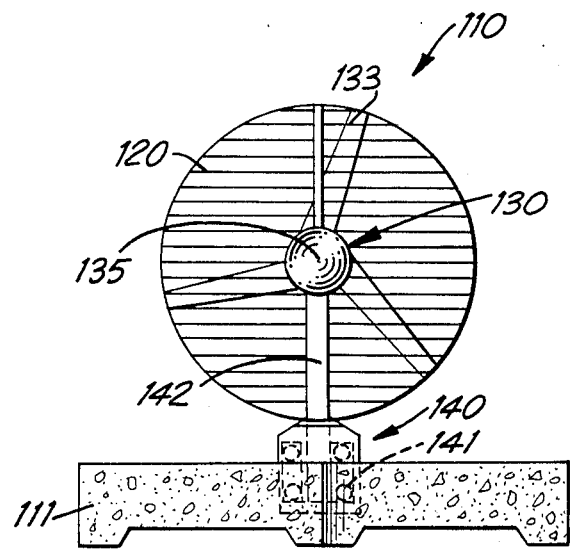
FIG. 9 is a front view of an alternative embodiment of the present invention.
Figure 10:
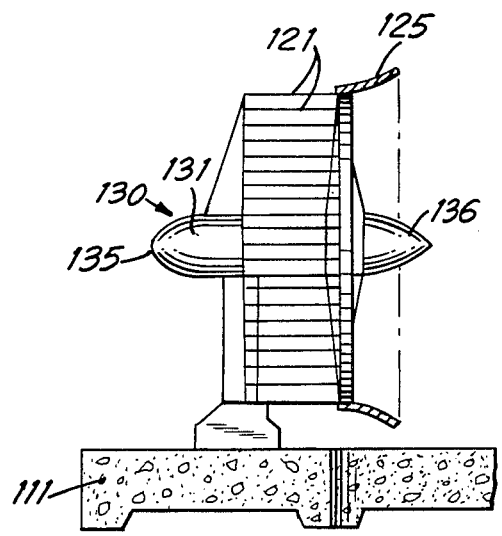
FIG. 10 is a side view of the embodiment of FIG. 9.
Figure 11:
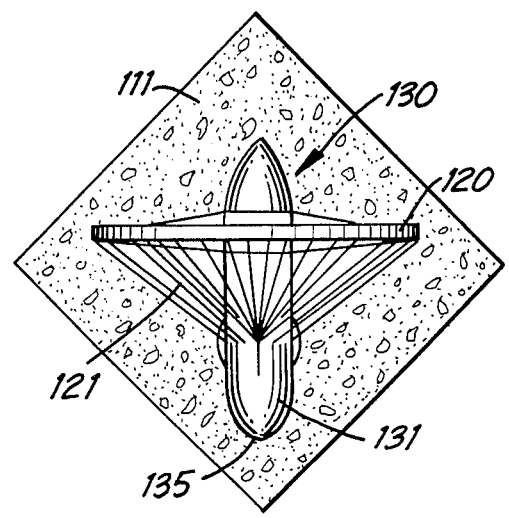
FIG. 11 is a top view of the embodiment of FIG. 9.

FIGS. 9–11 are directed to an alternative embodiment of the present invention wherein a bidirectional resource such as a tidal estuary can be used for generating electricity. The system 110 shown therein comprise a reinforced concrete base 11 to which a turbine 130 having downstream rotor 133 is connected along with a screen 120. The system further comprises a bearly 140 for permitting articulation around the yaw axis and comprising stops which permit slightly less than 180° rotation. This means comprises yaw bearing 141 partly embedded in the concrete base 111 connected to pylon 142 which is thereafter connected to nacelle 131.

Nacelle 131 also includes a forward fairing 135 and a hub fairing 136 to make the turbine more aerodynamic that is, helps the water flow more smoothly over the nacelle.

While the screen 120 includes screen grid bars 121, it can also comprise a small diffuser 125 attached to the screen bars. In the embodiment shown in FIGS. 9–11, it can be seen that the design is for a downstream rotor and although this is the preferred embodiment it should be noted that the nacelle and rotor assembly can be reversed to have an upstream of the major portion of the nacelle.

Figure 12:
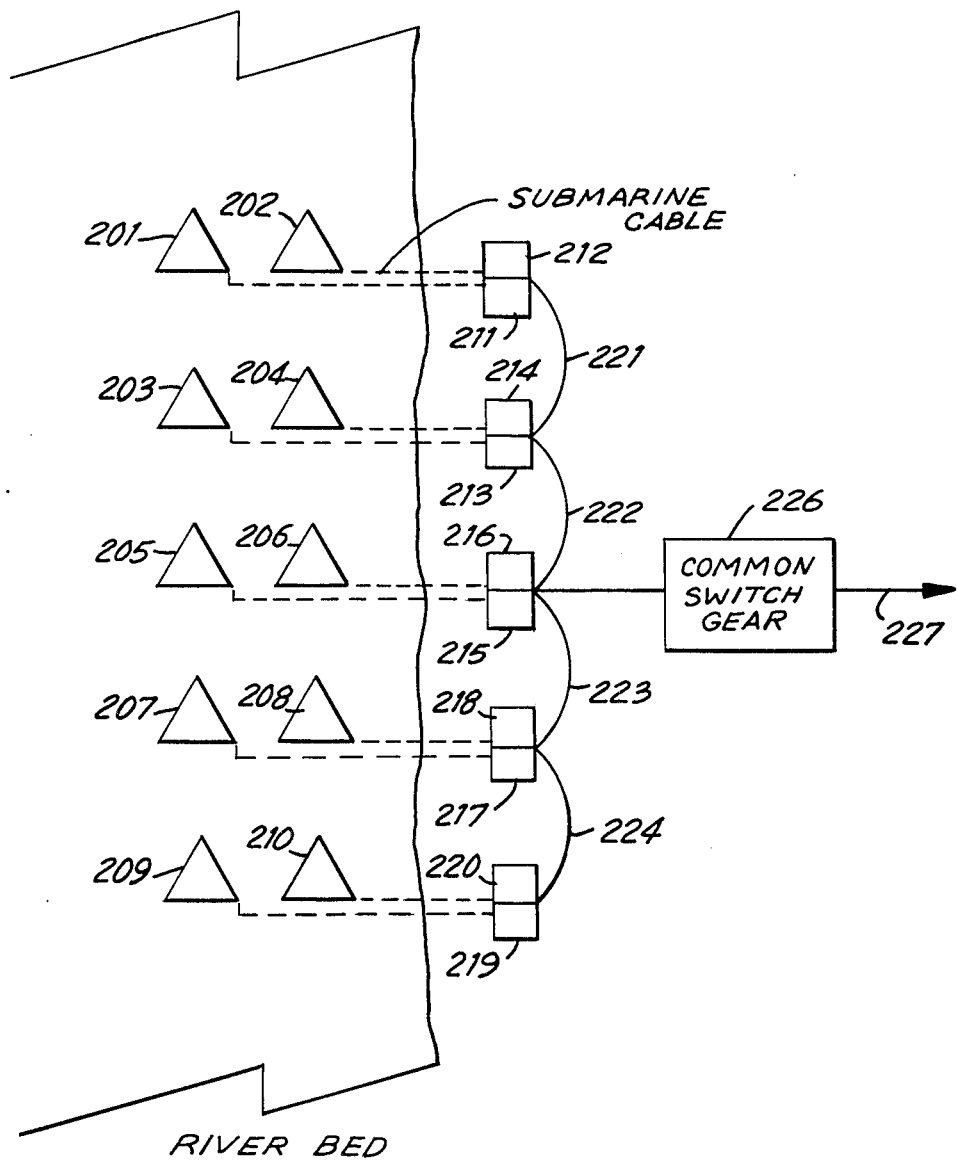
FIG. 12 is a schematic representation of a system according to the present invention.

FIG. 12 shows one embodiment of a kinetic hydro energy conversion system site using 10 turbines, all commonly connected to an electric grid.

As shown, five sets of two generators 201–210 are spaced apart every 40 meters. Generators 201 and 202 are connected respectively by submarine cables to two generator control boxes per pole 211, 212, turbines 203 and 204 are connected to boxes 213, 214, turbines 205 and 206 are connected to boxes 215, 216, turbines 207 and 208 are connected to boxes 217, 218 and turbines 209 and 210 are connected to boxes 219 and 220.

Two cables 221 connect boxes 211 and 212 to boxes 213 and 214 and two cable 224 connect boxes 219 and 220 to boxes 217 and 218. Four cables 222 are used to connect boxes 213, 214 to boxes 215 and 216 and four cables 223 are used to connect boxes 217 and 218 to boxes 215 and 216.

In one example, cable emanating from boxes 215 and 216 carrying 480 volts at 200 kilowatts is connected to a common switch gear 226 which can be a box or building on shore and which contains control logic and protective relaying for conditioning the power grid and interconnecting with utility grid or local damand. The output of the common switch gear 226 on cable 227 is 13 kilovolts at 200 kilowatts.

It will be appreciated that the instant specification and claims are set forth by way of illustration and not limitation, and that various modifications and changes may be made without departing from the spirit and scope of the present invention.

What is claimed is:

1. In a kinetic hydro energy conversion system having a turbine with a rotor including a cylindrical hub and blades having one end fixed to the hub, wherein the rotor rotates about an axis of rotation corresponding to the central axis of the hub, wherein each blade has an airfoil profile at any section thereof between the ends of the blade with a twist angle and chord length defined in accordance with Glauert equations, the improvement wherein the airfoil profile for each blade section disposed at a distance from the axis of rotation lies on the surface of a cylinder having its center at the axis of rotation and its radius equal to said distance from the axis of rotation, whereby the airfoil profiles will be aligned with the direction of rotation motion of the blades.

2. The system according to claim 1, further comprising means mounting the turbine for rotation about the yaw axis.

3. The system according to claim 1, wherein the turbine further comprises a water tight nacelle.

4. The system according to claim 3, wherein the rotor is mounted on the upstream side of the nacelle.

5. The system according to claim 3, wherein the rotor is mounted on the downstream side of the nacelle.

6. The system according to claim 1, further comprising screening means disposed upstream of the blades for horizontally deflecting debris away from the blades.

7. The system according to claim 6, wherein the screening means comprises a plumb bow screen.

8. The system according to claim 7, wherein the plumb bow screen comprises a ring around the blades, a vertical spine upstream of the rotor and a plurality of horizontal bars connected between the spine and the ring.

9. The system according to claim 2, wherein the mounting means includes means mounting the turbine for rotation of less than 180°.

10. The system according to claim 6, wherein the screening means comprises a single vertical leading edge and horizontal members extending rearwardly therefrom.

11. A method of producing blades for a kinetic hydro energy conversion turbine rotor comprising the steps of: determining a plurality of initially planar airfoil profiles to be disposed at different distances from the axis of rotation of the rotor, with each profile having a twist angle and chord length defined in accordance with Glauert airfoil equations; conforming each airfoil profile onto the surface of a cylinder having its center at the axis of rotation and its radius equal to the distance of the profile from the axis of rotation; and forming the outer surface of the blade according to the conformed profiles; whereby the airfoil profiles of the resulting blade will be aligned with the direction of rotating motion during use.

* * * * *